UNITED STATES PATENT OFFICE 1,924,101

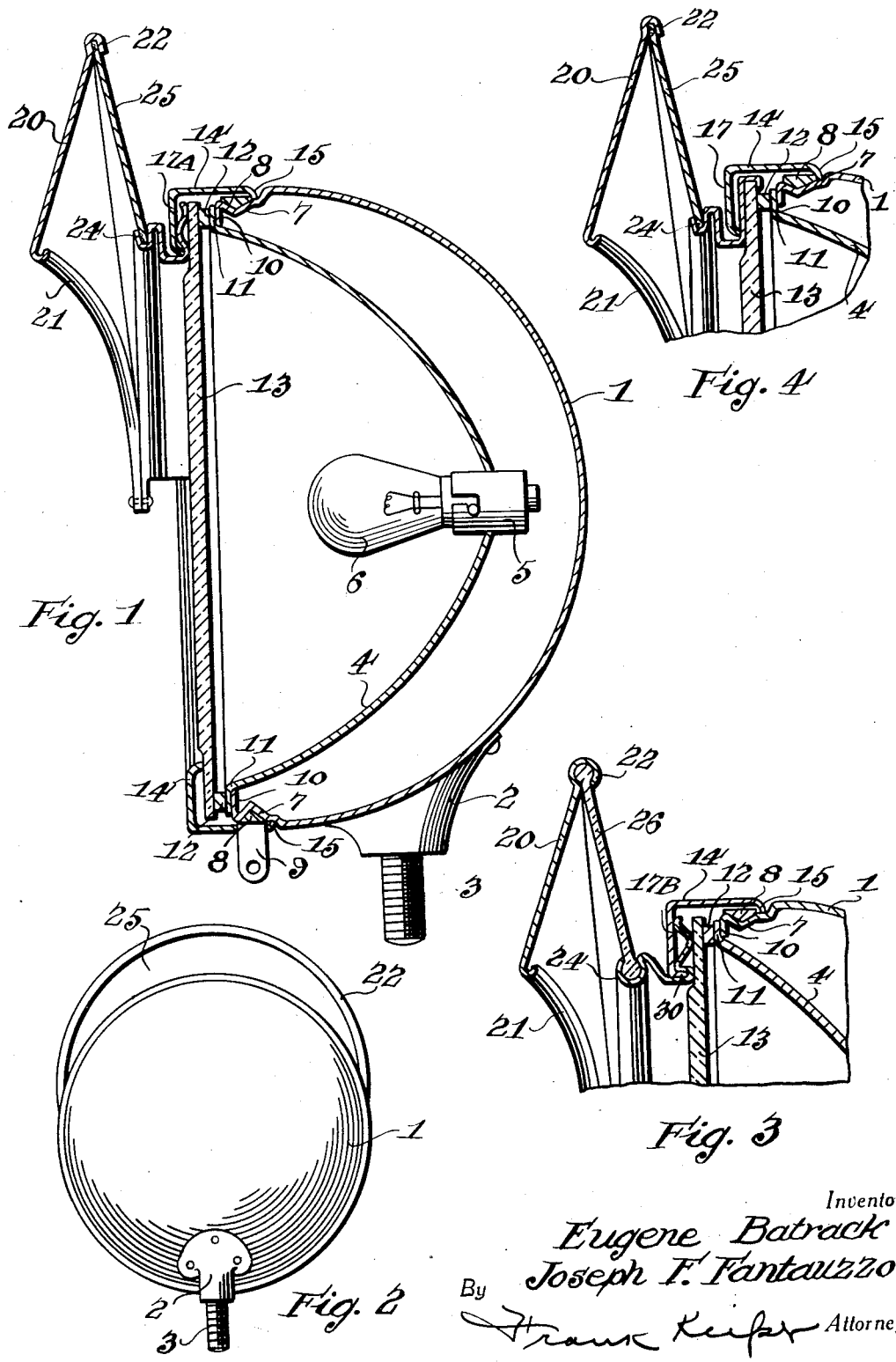

HEADLIGHT ATTACHMENT

Eugene Batrack and Joseph F. Fantauzzo, Rochester, N. Y.

Application March 19, 1932. Serial No. 599,974

2 Claims. (Cl. 240—8.4)

The object of this invention is to provide an attachment that can be placed on the rim of a headlight and project forward therefrom that will throw some of the light backwards from the headlight at the same time that the headlight is throwing light forward.

Another object of the invention is to make the attachment so that it can be placed on practically any and all of the standard headlights now in use.

Another object of the invention is to place a reflector substantially outside of the rim of the headlight, and forward of the headlight, so as to intercept certain rays that are radiated direct from the lamp, and this reflector is so pitched that it will intercept such rays, and throw them back over the top or side of the headlight.

Another object of the invention is to provide back of the reflector a transparent substance through which the light passes rearwardly, such as sheet celluloid or glass, which material will preferably be colored red or green, although it may be left water white.

Another object of the invention is to provide simple means by which it may be attached to the headlight.

These and other objects of the invention will be illustrated in the drawing, described in the specification and pointed out in the claims at the end thereof.

In the drawing:

Figure 1 is a vertical sectional view of a headlight, equipped with our improvement.

Figure 2 is a rear elevation of our improved headlight.

Figure 3 is a detail view of the upper portion of Figure 1, showing a modification thereof.

Figure 4 is a detail view showing in section a further modification of the structure shown in Figure 1.

In the drawing, like reference numerals indicate like parts.

In the drawing, reference numeral 1 indicates the shell or housing of the headlight supported on a pedestal 2, having a threaded stud 3 thereon. In this housing is provided a parabolic mirror 4, in the axis of which is provided a lamp socket 5, carrying the lamp 6. As shown in Figures 1 and 3, the forward rim of the housing has a V-shaped groove or molding 7 formed therein adapted to provide a seat for the split locking ring 8 having upturned ends 9 on the lower side thereof. The housing has on its forward edge an in-turned flange 10, which flange bears against an outwardly-turned flange 11 on the parabolic mirror 4. Against this flange 11 rests the washer 12, which is placed in front thereof, and in front of this washer is placed the headlight lens 13.

A bezel ring 14 is provided which encircles the rim of the lens and the rim of the housing 1. This bezel ring 14 extends rearwardly over the split locking ring 8, and ends with an in-turned flange 15 which engages behind the split ring 8. The various items of this headlight up to this point are substantially the same as other headlights, and my improvement added thereto will now be described as follows:

A piece of sheet metal is bent in segmental curves forming a bracket or molding, having grooves and flanges thereon as follows. A radial flange 17 is provided, the outer rim of which is bent rearward and down over the rim of the headlight lens 13. At the bottom of the flange 17, the metal is bent forward and up and out, with a U-shaped groove depending from the outer edge thereof. See Figure 4.

As shown in Figure 1, the radial flange 17A is formed with a reverse curve, the top and bottom of which bears against the front of the lens. At the bottom the metal is bent forward, and up and out, the same as shown in Figure 4. A corner is provided at the bottom which is engaged by the inwardly-turned edge of the bezel ring 14.

The flange 17 engages between the bezel ring 14 and the lens.

At the ends of this bracket are fastened the ends of the segmental reflector 20, which has a small bead 21 formed on the lower edge thereof, to stiffen it, and has a downwardly opening grooved edge 22 formed on the upper edge thereof. Between the grooved edge 22 and the U-shaped grooved edge 24 of the part 17, a transparent piece of celluloid 25 is inserted, and in the modification shown in Figure 3, between these two grooved edges a segmental piece of glass 26 is inserted.

The light rays are thrown out radially from the source of light of the lamp to the reflector surface 20 from which they are thrown rearwardly through the transparent segment 25. The light intercepted by the reflector and thrown rearwardly through the transparent segment 26 is visible to any driver approaching the car from behind, and it indicates to the driver approaching from behind very plainly whether the car carrying this headlight attachment is going straight ahead, or whether it will turn to the left or to the right. By keeping this in mind, he can judge to better advantage whether to pass the car, and what allowance to make therefor.

The car may be equipped with two of these improved headlights. The segment 25 in the headlight on the left will be green and the segment 25 in the headlight on the right will be red.

In Figure 3 we have shown a further modification of the molding 17B, in which a horizontal groove 30 is formed to receive the lower in-turned edge of the bezel ring 14, making a positive engagement between the molding and the ring.

We claim:

1. The combination of a headlight having a lens and a bezel ring for holding the lens in place, said ring having a flange, a molding having a groove therein adapted to engage with said flange, a crescent shaped reflector having its ends attached to said molding, a groove on the upper edge of said reflector, a groove on the outer edge of said molding, said reflector sloping down and forwardly, said reflector being adapted to intercept some of the direct rays of light and throw them rearwardly over the headlight, a colored transparent medium supported between said two last named grooves and transmitting light rearwardly from said headlights.

2. The combination of a headlight and a segmental grooved support attached inside of the rim thereof and extending downwardly under the edge of the rim and forward, a segmental reflector attached to the ends of said segmental support, the lower edge of the middle of the reflector being substantially on a horizontal plane with the lower edge of the support, said reflector sloping up and rearwardly higher than the headlight at a small angle to the vertical and being adapted to intercept some of the direct rays of light and throw them rearwardly over the headlight, a crescent-shaped transparent medium supported between said segmental support and the upper edge of said reflector through which the light can travel.

EUGENE BATRACK.
JOSEPH F. FANTAUZZO.